July 1, 1958  A. REISMAN ET AL  2,841,302
INDUSTRIAL TRUCK ATTACHMENT
Filed Sept. 6, 1956  5 Sheets-Sheet 3

INVENTORS.
*Howard Reisman &
Albert Reisman*
BY
*Jacob C. Kellem*
ATTORNEY.

July 1, 1958 A. REISMAN ET AL 2,841,302
INDUSTRIAL TRUCK ATTACHMENT
Filed Sept. 6, 1956 5 Sheets-Sheet 5

INVENTORS.
*Howard Reisman &*
*Albert Reisman*
BY
*Jacob C. Kellem*
ATTORNEY.

2,841,302
Patented July 1, 1958

2,841,302

INDUSTRIAL TRUCK ATTACHMENT

Albert Reisman and Howard Reisman, Philadelphia, Pa.

Application September 6, 1956, Serial No. 608,256

7 Claims. (Cl. 214—621)

This invention relates to an attachment for a fork-type industrial truck, and more particularly to an attachment which facilitates the transportation of articles freely resting on a pallet.

The fork-type industrial truck and pallet technique has revolutionized industrial material handling practices. Not only has it minimized labor in handling of transported articles, but it has also expanded existing storage facilities to their absolute ceiling.

Existing techniques have expeditiously managed pallet loads of substantially heavy articles such as heavy boxes or sacks, for example; but lighter articles such as cans of pretzels or potato chips fall off flat pallets unless they are restrained in some fashion. Heretofore, these articles have been carried within transporting enclosures, or they have been lashed or strapped together on flat pallets. However, walled carrying enclosures are expensive and difficult to load and unload; and lashing or strapping involves expense in material and valuable labor time.

An object of this invention is to provide an attachment for an industrial fork-type truck which facilitates the handling and transportation of lighter articles freely resting on a pallet.

In accordance with this invention an open-ended enclosure is secured to the front end of an industrial fork-type truck. The term industrial fork-type truck refers to any industrial material handling device which utilizes forks for lifting and transporting pallets or skids. Typical of this type are: pallet jacks, skid jacks, and fork-lift trucks.

This enclosure has side walls spaced apart a distance slightly greater than the lateral distance across an array of articles loaded on a pallet in substantial contact with each other. When the forks of the truck are engaged with the pallet, the array of articles on the pallet passes through the unobstructed open end of the enclosure between the spaced side walls which intimately confines the articles and prevents dislodgement during lifting and transportation.

A gate is provided at the open front end to longitudinally confine the articles during transportation. This gate may fully close the open end or only a portion of it, and operating means for opening it provide unobstructed passage for insertion and withdrawal of a loaded pallet. When the forks of the truck are made to laterally engage the pallet in a close fit, the insertion of the pallet load of articles within the enclosure is guided and facilitated. The front end of the enclosure may be supported on casters which may be resiliently mounted to facilitate insertion of the roller forks of a pallet jack. The side walls may be adjustably mounted on the rear wall of the enclosure or the front end of the truck to permit the space between them to be varied for accommodating pallet loads of different lateral measurements.

Novel features and advantages of the present invention will become obvious to one skilled in the art from a reading of the following description in conjunction with the drawings in which similar reference characters refer to similar parts and in which.

Figure 1:
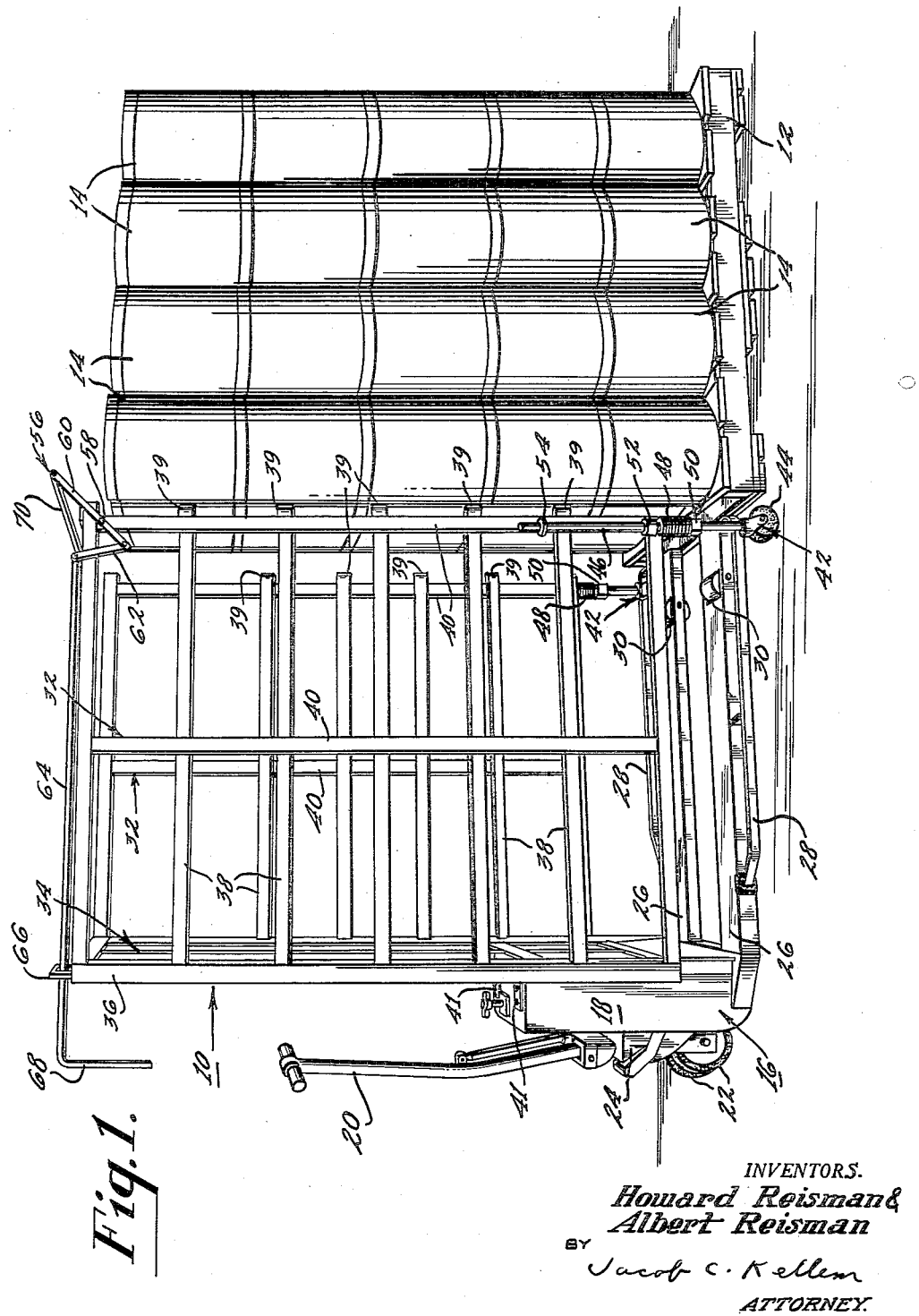
Fig. 1 is perspective view of an embodiment of this invention attached to a pallet jack about to engage a pallet load of cans.
Figure 2:
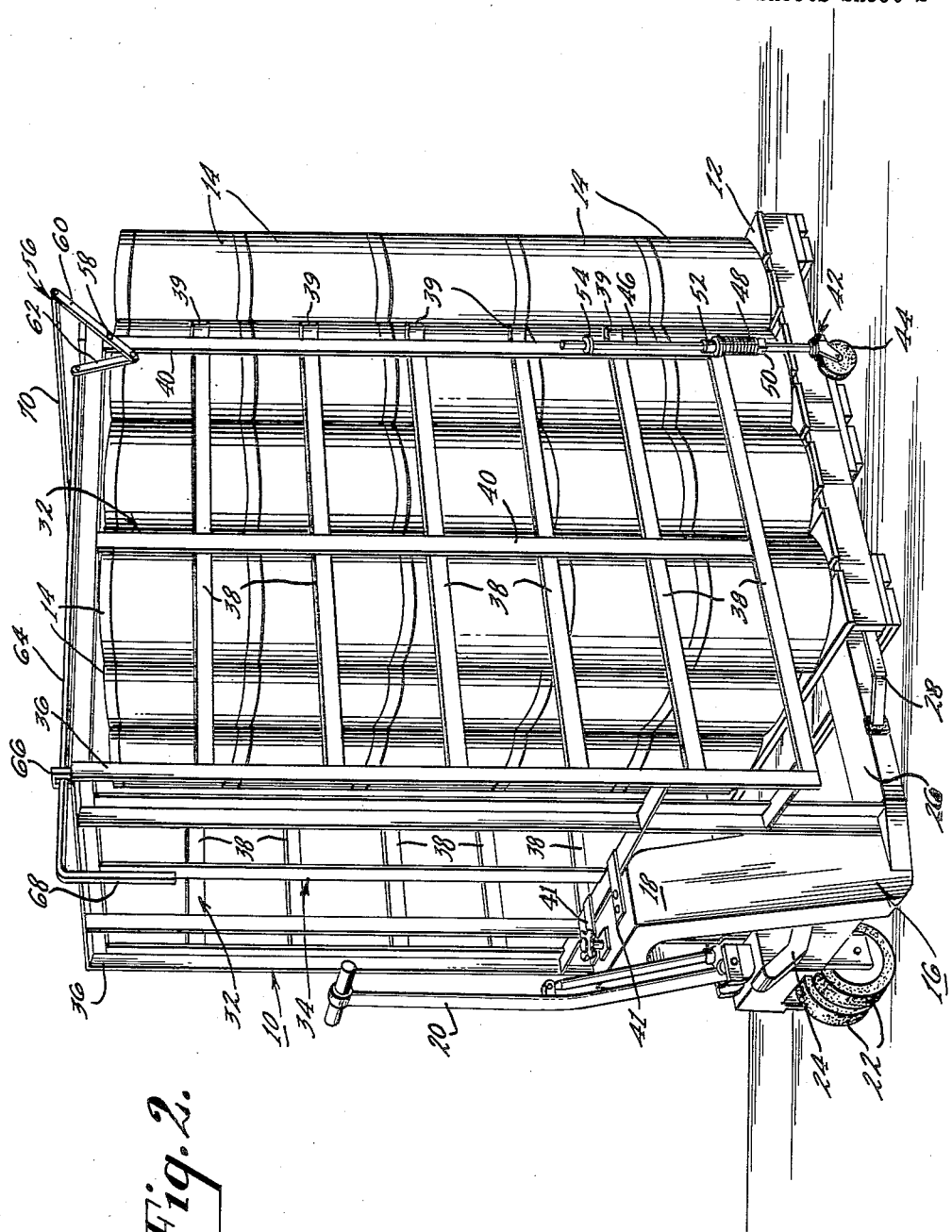
Fig. 2 is another perspective view of the embodiment shown in Fig. 1 with the pallet load of cans partially engaged.
Figure 3:
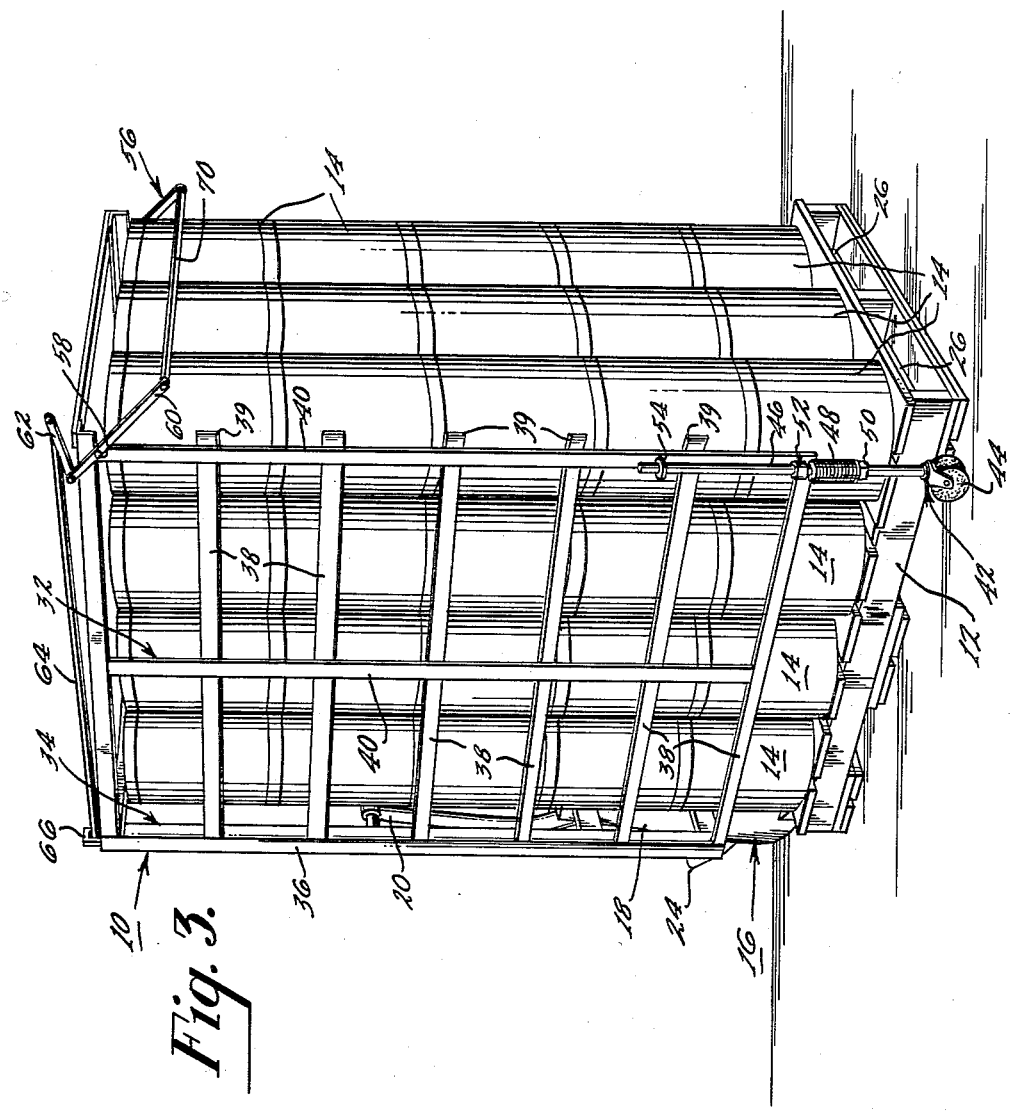
Fig. 3 is another perspective view of the embodiment shown in Fig. 1 with the pallet load fully engaged and ready to be transported.

Referring to Figs. 1 through 3, an attachment 10 is shown in three phases of engagement with a pallet 12 loaded with articles 14, which are relatively light round cans for example. These may be, for example, pretzel or potato chip cans, which are very light and bulky, which makes them difficult to transport on flat pallets without lashing or strapping them together.

Attachment 10, which may be described as an open-ended enclosure or cage is secured to the front end 18 of a conventional pallet jack 16 which includes a handle 20, wheels 22 and a lift mechanism generally indicated by reference character 24. Front end 18 is raised together with arms or forks 26 to lift and transport a pallet 12. Front end 18 may also accordingly be described as a lifting carriage.

Arms or forks 26 include lateral extensions or outriggers 28 to provide a close lateral fit with pallet 12 to guide the lateral engagement of enclosure 10 with the array of cans 14 freely resting on pallet 12. The front ends of forks 26 include rollers 30 which bump over the bottom wall of pallet 12 when forks 26 are inserted within the space between the upper and lower walls of a conventional pallet 12.

Enclosure 10 includes a pair of side walls 32 which are spaced apart a distance slightly greater than the lateral distance across the array of cans 14 freely resting on pallet 12. Since these cans 14 are loaded in regular rows, for example, on a rectangular pallet 12, they constitute a substantially rectangular array with adjacent cans 14 in contact with others. Side walls 32 are fixed at a set distance and may accordingly be used only with arrays of articles whose lateral measurement is slightly less than the distance between them.

Back walls 34 (see Fig. 2) is secured to side walls 32 to form an open-ended enclosure together with them. Side walls 32 and rear wall 34 are made, for example, of vertical steel angles 36 and horizontal steel strips 38. Ends 39 of horizontal strips 38 protrude past vertical strips 40 at the open end of enclosure 10 and are curved outwardly to facilitate insertion of cans 14 within enclosure 10. Rear or back wall 34 is secured to front end 18 by bolted straps or other conventional means (not fully shown). The attachment 10 may be bolted onto front end 18 so that it may be easily removed to permit the pallet jack 16 to be used in a conventional manner, or it may be permanently secured to the pallet jack 16 by welding, for example.

The front or open end of enclosure 10 is mounted on a pair of casters 42 which help support the weight of side walls 32. Casters 42 include wheels 44 which swivel on rods 46, which are resiliently secured to vertical strips 40 by means of bearing brackets 52 and 54. Collars 50 are secured to rods 46, and compression springs 48 disposed about rods 46 between collars 50 and bearing brackets 52 resiliently support the enclosure on the casters and rod assemblies.

A gate 56 includes, for example, a pair of side bars or levers 60 pivoted at 58 to the top of strips 40 at the open front end of enclosure 10. Side bars 60 are coupled by connecting links 62 to an actuating arm 64, which is guided within a bearing 66 and terminating in an operating handle 68. A closure bar 70 joins the extreme ends of side levers 60.

Gate 56 is shown in the open condition in Figs. 1 and 2 with bar 70 raised above the entrance to enclosure 10 which provides an unobstructed passageway for the insertion of the array of cans 14 on pallet 12 within enclosure 10. In Fig. 3 gate 56 is shown closed with bar 70 dropped against the top row of cans 14 where it accordingly prevents longitudinal movement of the cans 14 while they are being transported. Gate 56 is closed by forward movement of handle 68 and actuating arm 64. While gate 56 may be made to bear against all rows of articles within the array, it has been discovered that the illustrated retention of only the top row is sufficient for most applications.

Figure 4:
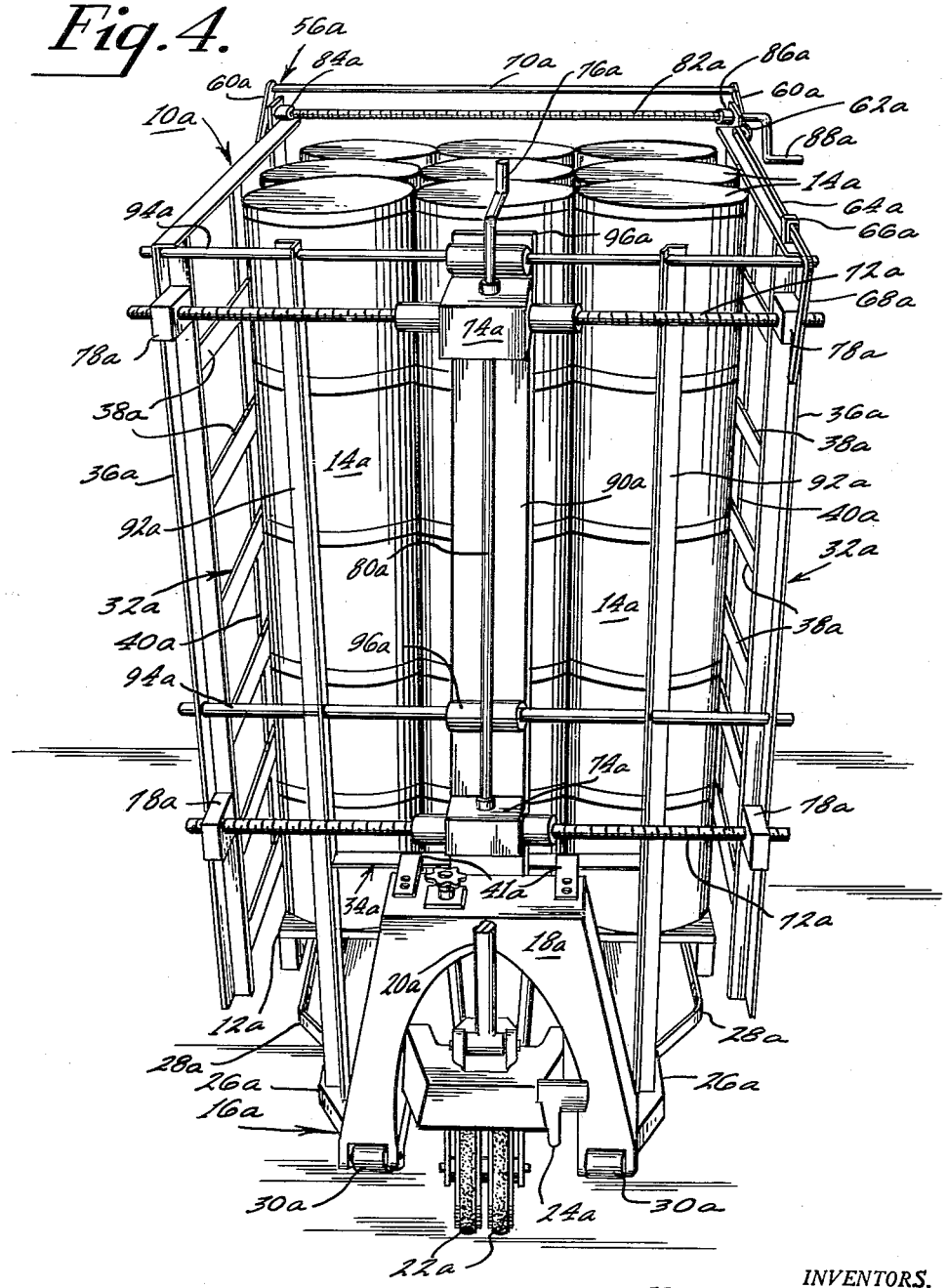
Fig. 4 is a perspective rear view of another embodiment of this invention attached to a pallet jack and partially engaged with a pallet load of cans.

In Fig. 4 is shown an embodiment of this invention whose side walls 32a are movable to variable spacings to accommodate arrays of articles of different lateral dimensions. The adjusting mechanism includes pairs of opposite hand lead screws 72a coupled to transmissions 74a, bevel gear type for example. An operating handle 76a is connected to upper transmission 74a to rotate the lead screws 72a which engage laterally movable nuts 78, which are secured to side walls 32a. An extension shaft 80a connects handle 76a through upper transmission 74a to lower transmission 74a. A single lateral adjusting screw 82a changes the spacing of the front end of side walls 32a. Screw 82a is anchored in one side wall by a bearing 84a and in the other side wall by a laterally moving nut 86a. Handle 88a rotates screws 82a in either direction to change the relative position of the front ends of side walls 32a.

A column 90a is secured to the front end 18a of pallet jack 16a to support the rear wall 34a of enclosure 10a and the incorporated adjusting mechanism. Rear wall 34a includes a pair of vertical angles 92a which are pierced to cooperate in supporting horizontal guide bars 94a which are centrally mounted in brackets 96a in column 90a. The ends of guide bars 94a pass through apertures in vertical rear corner angles 36a to guide them and attached side walls 32a in their lateral movement.

Bars 94a and 70a are conveniently made telescopic to avoid having ends protruding past side walls 32a, but these bars can merely protrude through apertures in the side walls where economy is most critical. The adjusting mechanism shown in Fig. 4 is only an illustrative way that relative movement of the side walls may be accomplished. Many other arrangements may be utilized to provide this feature.

Figure 5:
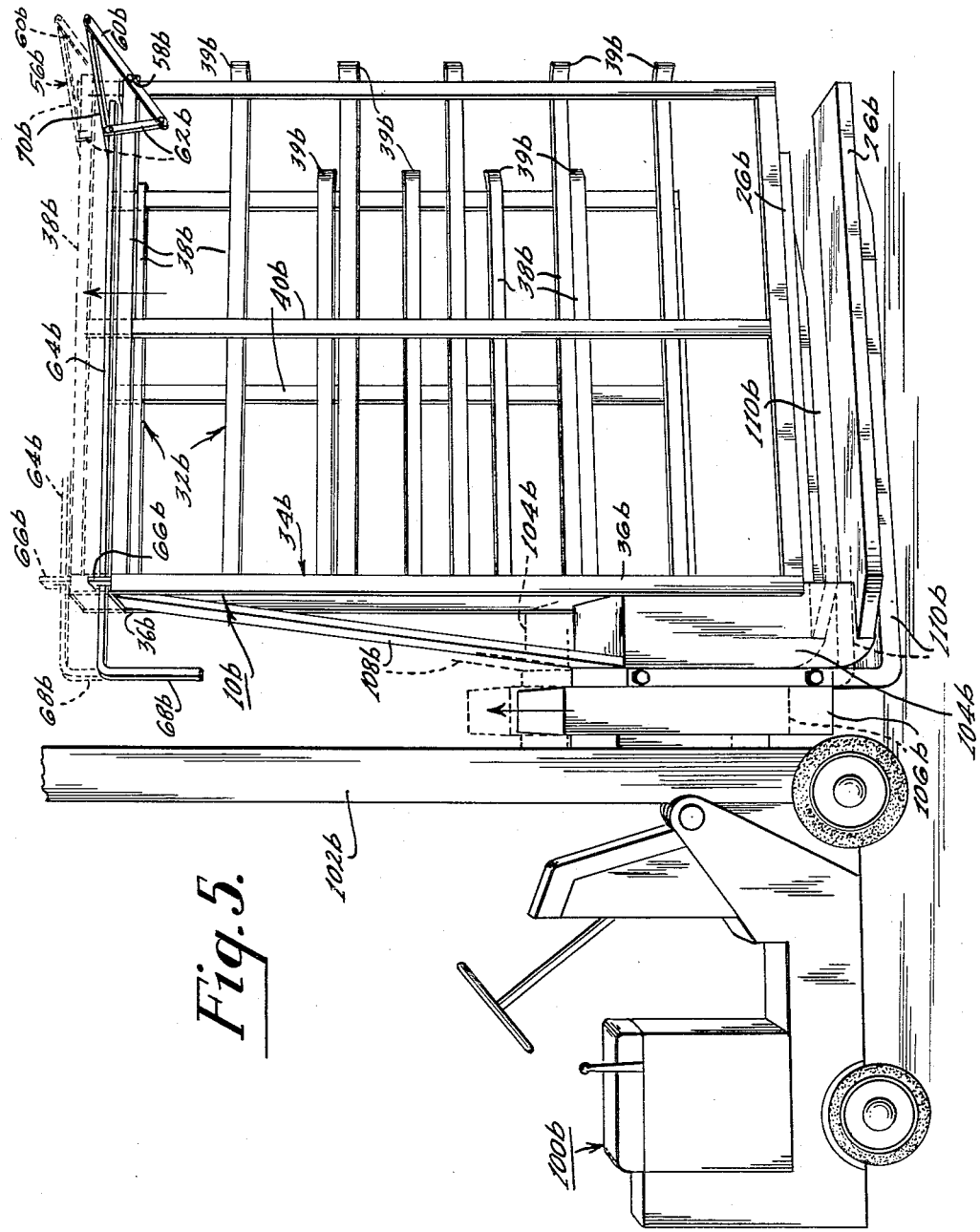
Fig. 5 is a perspective view of a further embodiment of this invention attached to a fork-lift truck.

In Fig. 5 an embodiment of this invention is shown attached to a fork-lift industrial truck 100b having upright guide channels 102b. Enclosure 10b is secured to the front end or lifting carriage 104b which is connected to truck 100b by coupling means 106b, which rides up and down within channels 102b in a conventional manner. Diagonal brace 108b anchors the top of rear enclosure wall 34b to lifting carriage 104b to help provide a cantilever support for enclosure 10b. The front or open end of enclosure 10b, therefore, need not itself be supported. Forks 110b support arms 26b which themselves are relatively wide to provide close lateral engagement with a pallet. Arm 68b is extended downward to be accessible when the lifting carriage 104b and enclosure 10b are elevated. Remote means for operating gate 56b from the operating station of the fork-lift truck 100b may also be provided for convenience of the driver.

*Operation*

Figs. 1–3 vividly illustrate step-by-step how an attachment 10 secured to a pallet jack 16 is engaged with a pallet load of cans 14 to lift and transport it without danger of dislodging any of the cans. Fig. 1 shows the pallet jack and enclosure with gate 56 raised to provide an unobstructed front end which permits the cans 14 to pass within side walls 32.

Fig. 2 shows the pallet jack partially engaged with pallet 12 with arms 26 and lateral extensions 28 closely fitting laterally within the walls of pallet 12. This assists in guiding the side walls 32 to clear the sides of the outer rows of cans on the pallet. Curved ends 39 of side walls 32 help correct any slight misalignment. As rollers 30 on arms 26 bump over the bottom wall of pallet 12, resiliently mounted casters 42 absorb the slight vertical movement of the front end of enclosure 10 and maintain it supported.

Fig. 3 shows gate 56 closed down by forward movement of handle 68 to drop bar 70 against the top rear row of cans. The resultant longitudinal confinement of this top rear row is transmitted to the rows beneath which are similarly restrained against ordinary transporting shocks.

After the pallet jack 16 and attached enclosure 10 are engaged with the array of can 14 on pallet 12, hydraulic lift 24 is operated to raise front end 18 and arms 26. This lifts pallet 12 and cans 14 together with enclosure 10. Resiliently mounted casters 42 continue to support the front end of enclosure 10. The pallet jack and its load of cans may be then rolled to its destination where the illustrated procedure is reversed to drop the pallet load. Extremely light and bulky articles, such as pretzel and potato chip cans, may be conveniently and safely transported on standard flat pallets without the usual lashing or strapping precautions. Other smooth articles which are restrained with difficulty, such as bricks or light cartons, can be expeditiously handled with similar enclosures attached to standard industrial fork-type trucks.

Fig. 4 illustrates an adjustable attachment 10a with side walls 32a whose spacing can be varied to accommodate articles and arrays of different size. A single attachment 10a may accordingly be used for pallet loads of a wide range of lateral dimensions. Gate 56 may be adapted to extend a variable distance within enclosure 10a to retain pallet loads of varying longitudinal dimensions.

Fig. 5 shows an attachment 10b secured to a fork-lift truck 100b. Pallet loads may thereby be transported and lifted to destinations a considerable height above ground level. Since enclosure 10b as well as 10 and 10a, is automatically engaged with a pallet and loads by a simple forward movement of the truck, only very slight additional head room or clearance is required for the enclosure 10b. Attachment 10b may be accordingly operated in any low head-room condition permitting operation of an ordinary fork-lift truck, and pallet loads may be accordingly stored in tiered racks or pigeon holes without strapping or lashing the articles to each other or to the pallet.

What is claimed is:

1. An attachment for a fork-type industrial truck for facilitating the transportation of articles freely resting in contact with other in an array on a pallet, said attachment comprising an enclosure secured to the front end of said truck, said enclosure having side walls spaced apart a distance slightly greater than the lateral distance across said array for intimately confining said articles in said array during transportation of said pallet, said front end of said enclosure being open and unobstructed for insertion of said array when said truck is engaged with said pallet, gate means being mounted adjacent the front end of said enclosure for longitudinally confining said array therewithin, and operating means being associated with said gate means for moving said gate means clear of said open end to permit insertion of said array and for interposing said gate means into the path of movement of said array after said array is inserted within said enclosure.

2. An attachment as set forth in claim 1 wherein said gate means is mounted at the top of said open end and confines only an upper row of said articles.

3. An attachment as set forth in claim 1 wherein the forks of said truck are adapted for close lateral engagement with said pallet to assist in guiding the insertion of said array within said enclosure.

4. An attachment as set forth in claim 1 wherein said open front end of said enclosure is mounted on a pair of casters.

5. An attachment as set forth in claim 4 wherein said casters are resiliently mounted.

6. An attachment as set forth in claim 1 wherein said side walls are engaged with the rear wall of said enclosure by adjustable means which permits the space between said side walls to be varied for accommodating arrays of articles of different lateral sizes.

7. An attachment for a fork-lift type industrial truck including a lifting carriage comprising the combination as set forth in claim 1 wherein said enclosure is mounted upon said lifting carriage, and structural means are provided for supporting the front end of said enclosure free of the ground.

References Cited in the file of this patent

UNITED STATES PATENTS

| | | |
|---|---|---|
| 2,335,572 | Schroeder | Nov. 30, 1943 |
| 2,400,661 | Struensee et al. | May 21, 1946 |
| 2,514,563 | Todd | July 11, 1950 |
| 2,589,342 | Christenson | Mar. 18, 1952 |
| 2,681,712 | West | June 22, 1954 |
| 2,702,646 | Van Doren | Feb. 22, 1955 |
| 2,760,663 | Tatum | Aug. 28, 1956 |

FOREIGN PATENTS

| | | |
|---|---|---|
| 884,314 | Germany | July 27, 1953 |